United States Patent
Sakthikumar et al.

(10) Patent No.: US 9,507,937 B2
(45) Date of Patent: Nov. 29, 2016

(54) REPORTING MALICIOUS ACTIVITY TO AN OPERATING SYSTEM

(75) Inventors: Palsamy Sakthikumar, Puyallap, WA (US); Vincent Zimmer, Federal Way, WA (US); Robert C. Swanson, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 84 days.

(21) Appl. No.: 13/992,009

(22) PCT Filed: Mar. 30, 2012

(86) PCT No.: PCT/US2012/031511
§ 371 (c)(1),
(2), (4) Date: Jun. 6, 2013

(87) PCT Pub. No.: WO2013/147859
PCT Pub. Date: Oct. 3, 2013

(65) Prior Publication Data
US 2013/0340081 A1    Dec. 19, 2013

(51) Int. Cl.
*G06F 21/56*    (2013.01)

(52) U.S. Cl.
CPC ............. *G06F 21/56* (2013.01); *G06F 21/566* (2013.01)

(58) Field of Classification Search
CPC .......... G06F 9/06; G06F 9/441; G06F 13/32; G06F 21/56; G06F 21/00; G06F 21/566
See application file for complete search history.

(56) References Cited

U.S. PATENT DOCUMENTS

| 5,911,777 | A  | * | 6/1999 | Heredia | G06F 1/1632 710/303 |
|---|---|---|---|---|---|
| 6,581,162 | B1 | * | 6/2003 | Angelo et al. | 713/193 |
| 6,591,362 | B1 | * | 7/2003 | Li | G06F 21/572 713/1 |
| 7,051,222 | B2 | * | 5/2006 | Wyatt et al. | 713/323 |
| 2002/0129195 | A1 | * | 9/2002 | Hongo | G06F 15/7814 711/104 |
| 2002/0129277 | A1 | * | 9/2002 | Caccavale | 713/201 |
| 2003/0131248 | A1 | * | 7/2003 | Huang | 713/188 |
| 2003/0140271 | A1 | * | 7/2003 | Wynn et al. | 714/8 |
| 2005/0050339 | A1 | * | 3/2005 | Himmel et al. | 713/189 |
| 2005/0166213 | A1 | * | 7/2005 | Cromer et al. | 719/315 |
| 2006/0200672 | A1 | * | 9/2006 | Calhoon | G06F 21/16 713/176 |
| 2007/0258469 | A1 | * | 11/2007 | Bennett | 370/400 |
| 2008/0134321 | A1 | * | 6/2008 | Rajagopal et al. | 726/21 |
| 2008/0320313 | A1 | * | 12/2008 | Awad et al. | 713/189 |
| 2009/0024640 | A1 | * | 1/2009 | Petri | G06F 17/2205 |
| 2011/0055469 | A1 | * | 3/2011 | Natu et al. | 711/105 |
| 2011/0131662 | A1 | * | 6/2011 | Matsuoka | G06F 21/305 726/26 |
| 2011/0296117 | A1 | * | 12/2011 | Fukuda | G06F 12/1483 711/154 |
| 2012/0255012 | A1 | * | 10/2012 | Sallam | 726/24 |
| 2012/0266259 | A1 | * | 10/2012 | Lewis | 726/30 |
| 2012/0297177 | A1 | * | 11/2012 | Ghosh et al. | 713/2 |
| 2014/0237299 | A1 | * | 8/2014 | Nachimuthu | G06F 11/0772 714/42 |

* cited by examiner

*Primary Examiner* — Amir Mehrmanesh
(74) *Attorney, Agent, or Firm* — Trop Pruner & Hu, P.C.

(57) ABSTRACT

An apparatus includes a memory that is accessible by an operating system; and a basic input/output system (BIOS) handler. The BIOS handler, in response to detected malicious software activity, stores data in the memory to report the activity to the operating system.

16 Claims, 5 Drawing Sheets

REPORTING MALICIOUS ACTIVITY TO AN OPERATING SYSTEM

BACKGROUND

Malicious software (also called "malware") refers to unauthorized instructions that when executed by a computer adversely affects the performance of the computer and/or compromises the integrity of data stored on the computer. As examples, malicious software may gain access to applications; disrupt computer operations; erase files that are stored on the computer; gather sensitive information (passwords or other personal information, for example); track the behaviors of users of the computer; use the computer for unintended operations; and so forth.

Malicious software may be packaged in many different forms. As examples, the malicious software may a virus, which replicates itself from one computer to the next; a Trojan horse that appears harmless (appears to be provided by an authorized supplier, for example), thereby disguising its malicious intent; a worm that propagates through network security; and so forth.

DETAILED DESCRIPTION

Figure 1:
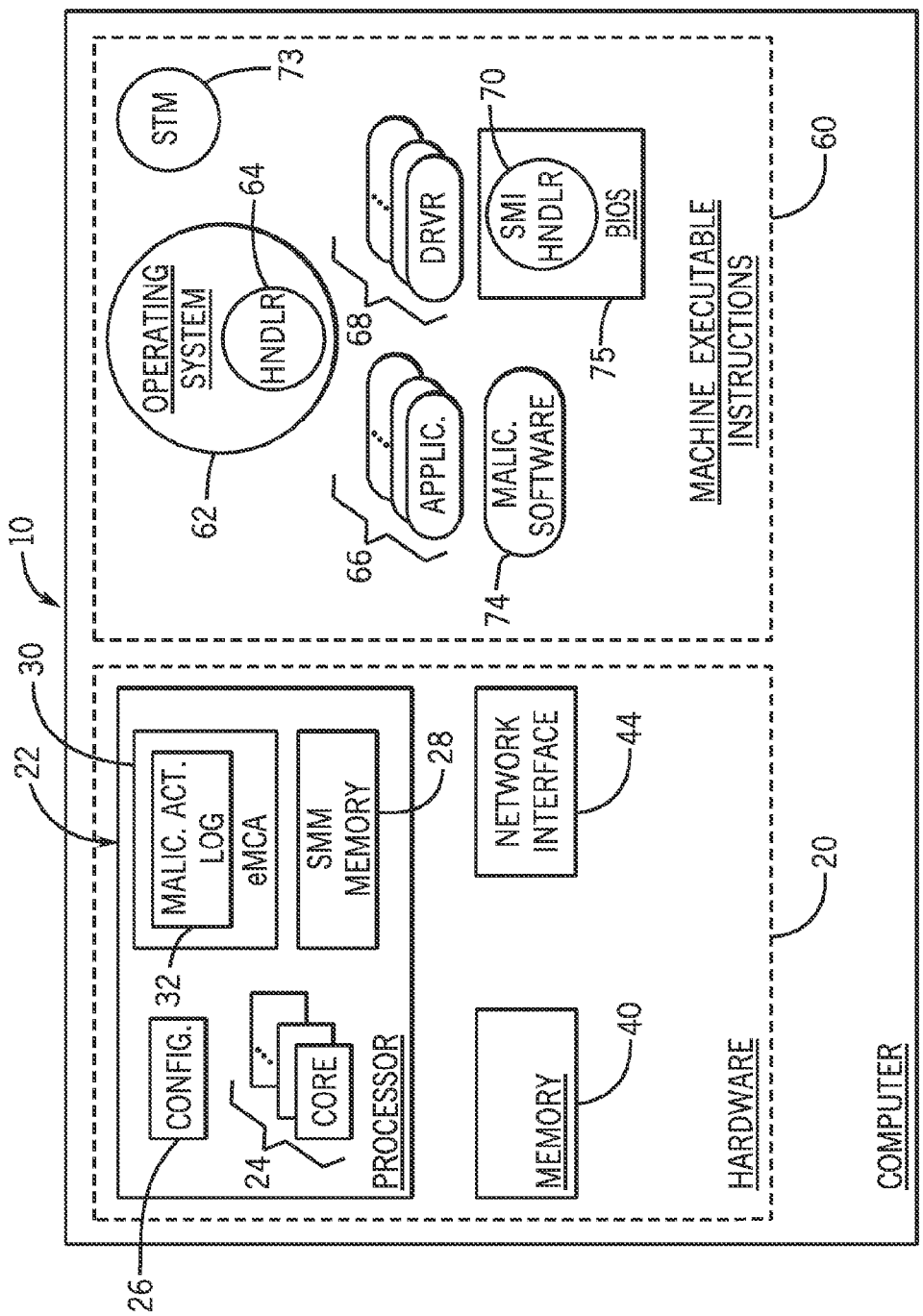
FIG. 1 is a schematic diagram of a computer according to an exemplary implementation.

Referring to FIG. 1, a computer 10, in accordance with implementations disclosed herein, executes machine executable instructions, or "software," and as such, may be exposed to malicious activity due to the unintended execution of malicious software 74 by the computer 10. In this context, the "malicious software 74" refers to one or more unauthorized machine executable instructions that may be executed by one or more processors 22 of the computer 10 for purposes of causing "malicious activity," or unauthorized activity on the computer 10, such as (as non-limiting examples) activity that adversely affects the performance of the computer 10; allows access to, copies and/or corrupts data stored or gathered by the computer 10; allows access to, copies and/or or modifies one or more files stored on or accessed by the computer 10; displays visual and/or aural output on the computer 10; corrupts machine executable instructions; controls access to one or more functions of the computer 10; and/or compromises the integrity of the data that is stored on the computer 10.

The malicious software 74 may be executed at any of a number of different processing levels, such as at the operating system level or at the basic input/output system (BIOS) level, as non-limiting examples. The malicious software 74 may be packaged in any of a number of different forms and as such, may be adware, spyware, viruses, Trojan horses, worm, rootkits, and so forth. Moreover, the malicious software 74 may be compiled machine executable instructions or may be un-compiled machine executable instructions. Therefore, the malicious software 74 may include, as non-limiting examples, script as well as compiled, program code.

The processor 22 may contain several mechanisms to detect malicious activity due to execution of the malicious software. However, without the systems and techniques that are disclosed herein, the processor's detection of malicious activity may remain unnoticed by an operating system and as such may not undertake the appropriate corrective action. As non-limiting examples, the corrective action taken by the operating system 62 may involve the operating system 62 (through an application or directly through the operating system 62 itself) taking one or more measures to the malicious software 74, such as containing or deleting the malicious software 74, repairing files affected by the malicious software 74, recovering data affected by the malicious software 74, repairing one or more applications affected by the malicious software 74, informing a user of the computer 10 about the malicious software 74, and so forth.

More specifically, in accordance with systems and techniques that are disclosed herein, the processor 22 uses its system management mode (SMM) to report any malicious activity detected by the processor 22 to an operating system 62 of the computer 10. In this manner, during its course of operation, the processor 22 occasionally enters the SMM in which the processor 22 suspends execution of the operating system 62 and executes instructions that are associated with BIOS of the computer 10 for such purposes as handling system events pertaining to memory or chipset errors, performing thermal management operations, performing security functions, communicating with a trusted memory, and so forth, as can be appreciated by the skilled artisan. As described herein, the processor 22 may further take actions in the SMM to report malicious activity detected by the processor 22 to the operating system 62 of the computer 10.

In accordance with implementations that are disclosed herein, the processor 22, when in the SMM, logs any detected malicious activity in one or more malicious activity logs 32 in a memory 30 that is accessible, or readable, by the operating system 62. In this manner, the malicious activity log(s) 32 inform the operating system 62 about any malicious activity and informs the operating system 62 about the address of the detected malicious activity so that the operating system 62 may take the appropriate corrective action.

Figure 2:
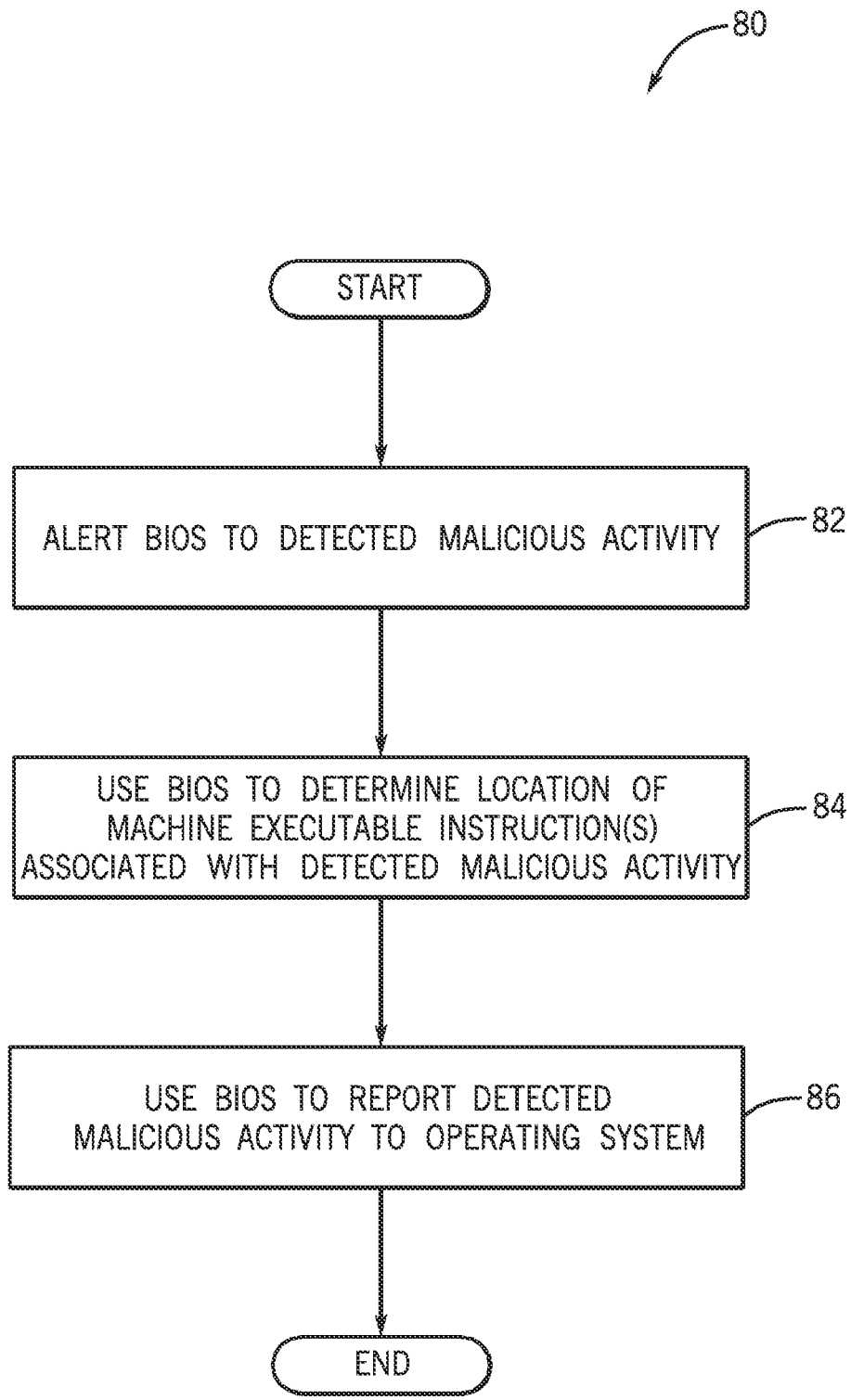
FIG. 2 is a flow diagram depicting a technique to report detected malicious activity to an operating system of the computer of FIG. 1 according to an exemplary implementation.

Referring to FIG. 2 in conjunction with FIG. 1, in accordance with exemplary implementations that are disclosed herein, a technique 80 includes alerting (block 82) a BIOS of a computer to detected malicious activity and using (block 84) the BIOS to determine an address, or location, of one or more machine executable instructions, which are associated with the detected malicious activity. The BIOS is used to report (block 86) the location of the detected viral activity to the operating system so that the operating system may take the appropriate corrective action.

Referring back to FIG. 1, in accordance with exemplary implementations, the computer 10 is a "physical machine," which means that the computer is a machine that is made of actual software and hardware. As non-limiting examples, the computer 10 may be a client, a server, a switch, a router, a desktop computer, a portable computer, a smartphone, a tablet computer, a cellular telephone, a combination of one or more of these devices, and so forth.

More specifically, being a physical machine, the computer 10 includes hardware 20, such as one or more processors 22, a memory 40 (a dynamic random access memory (DRAM), for example), a network interface 44, and so forth. In accordance with some implementations, the processor 22 may be a microprocessor (the Intel® Xeon® microprocessor, as a non-limiting example) that has one or more processing cores 24 that may execute various machine executable instructions, or "software."

In accordance with exemplary implementations, the processor 22 may be an integrated circuit package that includes one or more dies that contain the processing core(s) 24. In accordance with exemplary implementations, the software that is executed on the computer 10 may include one or more applications 66; one or more drivers 68; a BIOS 75, including a malicious activity system management interrupt (SMI) handler 70 (described further below); and the operating system 62.

Depending on the particular implementation, the operating system 62 may be a "host" operating system, i.e., an operating system that is installed on the computer 10 and does not operate in a virtual environment; or alternatively, the operating system 62 may be a "guest" operating system that operates in a virtual environment. In this regard, the "guest" operating system may be associated with a virtual machine (VM), which shares physical resources of the computer 10, with other similar VMs of the computer 10. These physical resources include, as a list of non-limiting examples, the hardware 20 and various components of the machine executable instructions 60.

As a more specific example, a particular guest operating system may be a virtual machine monitor (VMM), or "hypervisor," which manages the sharing by the VMs of the physical resources of the computer 10, including the hardware 20. In general, the VMM provides an interface between the operating system of each VM and the underlying hardware 20 of the computer 10.

In the context of this application, the term "operating system" thus refers to a host operating system, as well as a guest operating system, such as the VMM. Moreover, in accordance with some implementations, the "operating system" may be a trusted operating system, such as a tOS or MVMM (Measured Virtual Machine Monitor). It is noted that the computer 10 may have multiple operating systems 62 (a host operating system and one or more guest operating systems), in accordance with exemplary implementations.

In accordance with some example implementations, the computer 10 may include a peer monitor, also called a system management interrupt (SMI) Transfer Monitor (STM) 73, which is a hypervisor that runs in parallel to the main hypervisor and allows for hosting the OEM SMM as a guest. The STM 73 may therefore have the alerting/recovery logic of the SMI handler 70, as disclosed herein; and because the STM 73 runs underneath the OEM SMM code, the STM 73 has a higher privilege than the OEM SMM code. The STM 73 may be delivered by the CPU vendor.

The processor 22 may detect malicious activity that arises from the execution of the malicious software 74 in one of numerous ways. As a non-limiting example, the processor 22 may detect malicious activity by detecting when the malicious software 74 attempts to modify configuration bits 26 of the processor 22. For example, the configuration bits 26 may be Configuration Space Register (CSR) bits of the processor 22, which encode chipset and processor configurations. The processor 22 may contain security features, called "locks," to prevent the malicious software 74 from changing the configuration bits 26 and further contain logic to monitor attempted accesses to the configuration bits 26 to detect when an unauthorized attempt has been made to change the bits 26 (i.e., when an attempt has been made to modify the configuration bits 26 without removing the locks). In accordance with exemplary implementations, in response to the malicious software 74 attempting to modify the configuration bits 26, the processor's logic responds by generating a system management interrupt (SMI) to notify the BIOS 75 about the attempt.

As another non-limiting example, the processor 22 may detect malicious activity by detecting, during the SMM, an attempt to execute instructions outside of a designated SMM memory region 28. In this manner, the malicious software 74 may attempt to direct the processor's execution in the SMM to malicious instructions instead of authorized SMM instructions. The processor 22 may contain logic to detect such an attempted execution and assert a general protection exception (GPE), which then triggers an SMI to notify the BIOS 75 about such an attempt after the present session does a return from SMM (RSM). In this manner, in accordance with example implementations, upon the RSM, the processor 22 returns to the SMM to process the SMI.

In accordance with some implementations, the computer 10 invokes the SMI handler 70 (i.e., a BIOS handler) in response to the detection of malicious activity. In general, the SMI handler 70 is part of the BIOS 75 and reports detected malicious activity to the operating system 62. More specifically, in accordance with exemplary implementations, the handler 70 determines an address of the malicious software 74, logs the address in the malicious activity log 32 and asserts a signal to alert the operating system 62 to check the log 32 when execution of the operating system code resumes. In this manner, when the processor 22 returns from the SMM and resumes executing operating system instructions, a handler 64 of the operating system 62 responds to the signal and reads the log 32, which informs the operating system 62 of the detected malicious activity, as well as the address of the malicious software 74 so that the operating system 62 may take the appropriate corrective action.

In accordance with exemplary implementations, the memory 30 is an enhanced Machine Check Architecture (eMCA) memory of the processor 22, such as one or more registers, of the processor 22. In general, the eMCA memory includes error status banks, which are used for such other purposes as logging software and hardware errors by the SMM, as the operating system 62, upon the processor 22 returning from the SMM, reads the eMCA memory 30 for purposes of identifying the hardware and/or software errors, which were identified by the SMM. In accordance with exemplary techniques and systems that are disclosed herein, the eMCA memory 30 further includes the log 32 that details any detected malicious activity.

Figure 3:
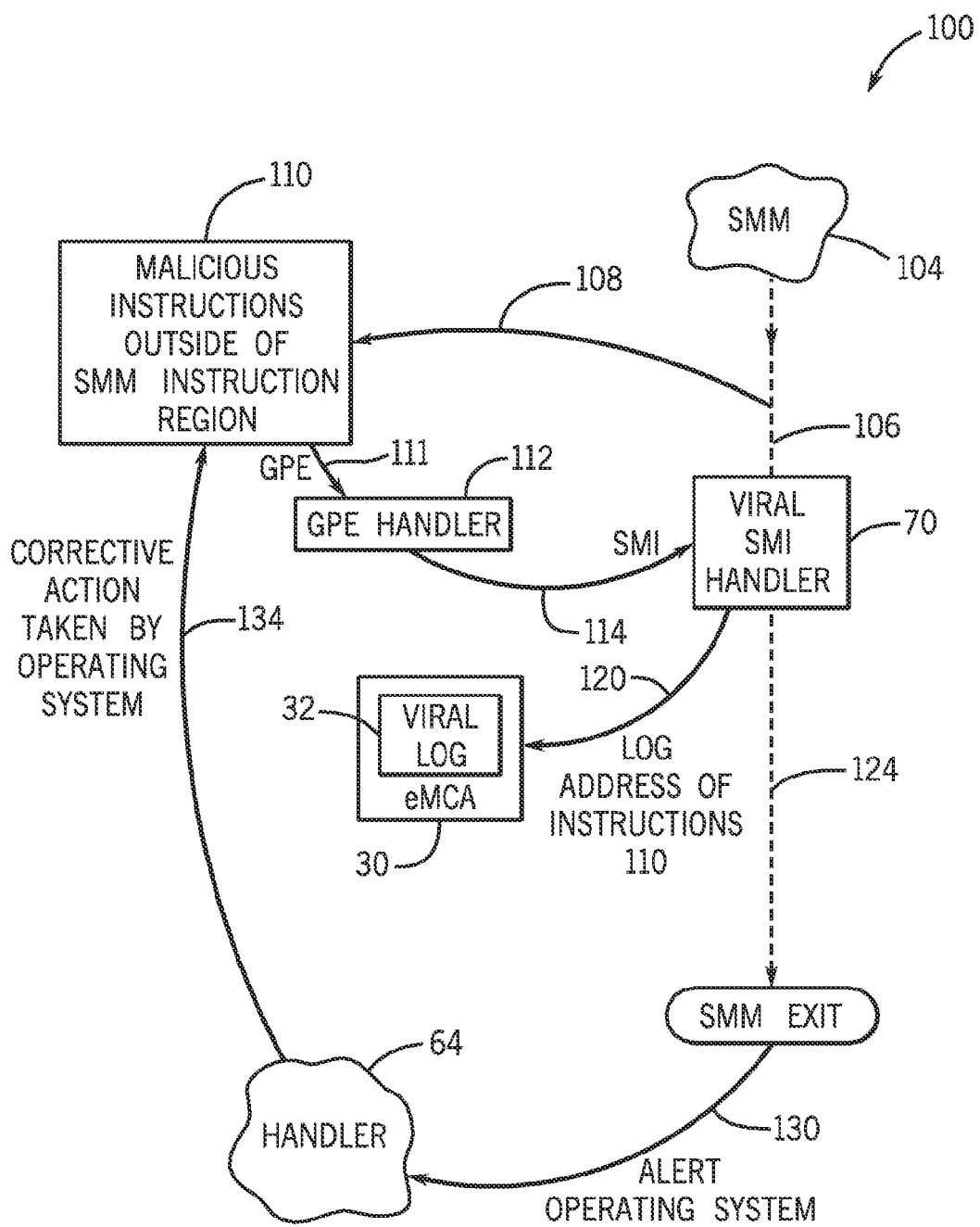
FIGS. 3 and 4 are illustrations of techniques to detect and report detected malicious activity to the operating system according to exemplary implementations.

As a more specific example, FIG. 3 depicts an illustration 100 of actions taken by the computer 10 in response to detected malicious activity. Referring to FIG. 3 in conjunction with FIG. 1, for this example, the processor 22 is in the SMM and executing SMM instructions 104 along an execution path 106 when an attempt is made (as illustrated by path 108) to divert the processor's execution to malicious instructions 110 that are located outside of the SMM instruction region 28. The processor 22 detects this attempt and correspondingly generates a general protection exception (GPE) 111, which invokes a GPE handler 112. In general, the GPE handler 112 uses a memory, or stack, which saves the address, or location, of the malicious instructions 110. The GPE handler 111 further generates an SMI 114, which invokes the SMI handler 70.

The SMI handler 70 creates a log 32 in the memory 30, which contains the location of the malicious instructions 110, as indicated by the location saved in the stack of the GPE handler 112. The SMI handler 70 then proceeds 124 to exit, and upon exiting, the handler alerts 130 the operating system 62 to check the memory 30.

As a non-limiting example, in accordance with some implementations, the viral SMI handler 70 asserts a signal called "SIGNAL_MCE" to generate an MCA interrupt upon the SMM exit. The MCA interrupt, in turn, causes the operating system 62 to check the memory 30 when execution of the operating system instructions resume. As a non-limiting example, the SIGNAL_MCE signal may be set by a register bit of the processor 22, in accordance with some implementations. Therefore, in response to the assertion of the SIGNAL_MCE signal, the handler 64 is invoked, which is notified about the detected malicious activity and address of the malicious activity via the log 32. The handler 64 may then take 134 the appropriate corrective action.

Figure 4:
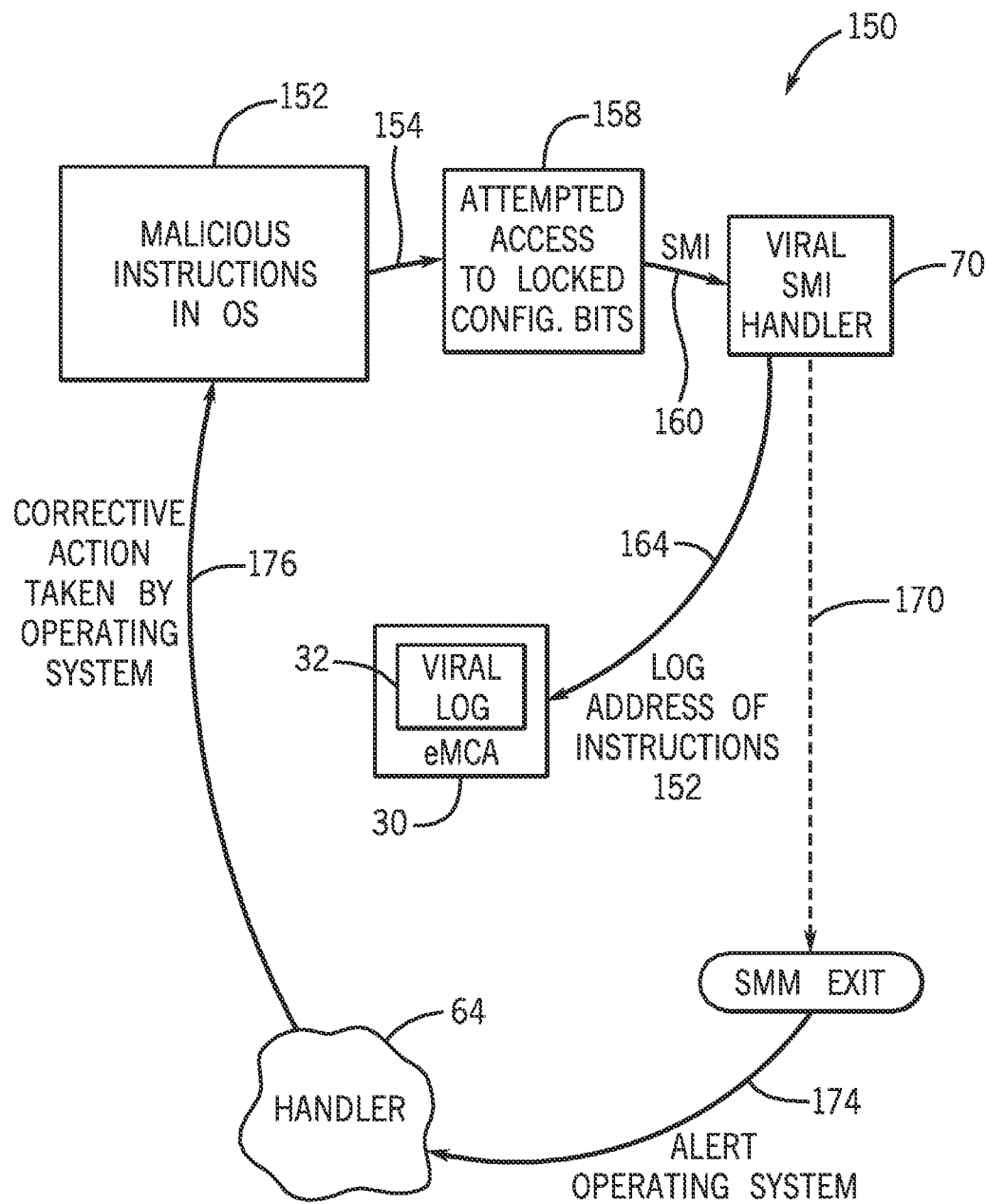

FIG. 4 depicts actions taken by the computer 10 in response to malicious activity according to another example. Referring to FIG. 4 in conjunction with FIG. 1, for this exemplary malicious activity, malicious instructions 152 of the operating system 62 attempt an access to the locked configuration bits 26 of the processor 22, as indicated by reference numerals 154 and 158. The processor 22 detects this attempted access and correspondingly generates 160 an SMI, which causes the processor 22 to enter the SMM and invoke the SMI handler 70.

For this example, the SMI handler 70 determines the address of the malicious instructions 152 by examining the contents of the processor's selector and instruction pointer (CS:RIP). The handler 70 then creates a corresponding log entry in the log 32 of the memory 30, which contains the address of the malicious instructions 152. The SMI handler 70 then proceeds 170 to exit the SMM mode and alert 174 the operating system 62. As a non-limiting example, this alert may involve asserting the SIGNAL_MCE signal, which causes the assertion of an MCE interrupt. Thus, due to the assertion of the SIGNAL_MCE signal, the operating system handler 64 is informed of the detected malicious activity and the address of the malicious activity via the log 32; and then the operating system handler 64 may then take 176 the appropriate corrective action.

Figure 5:
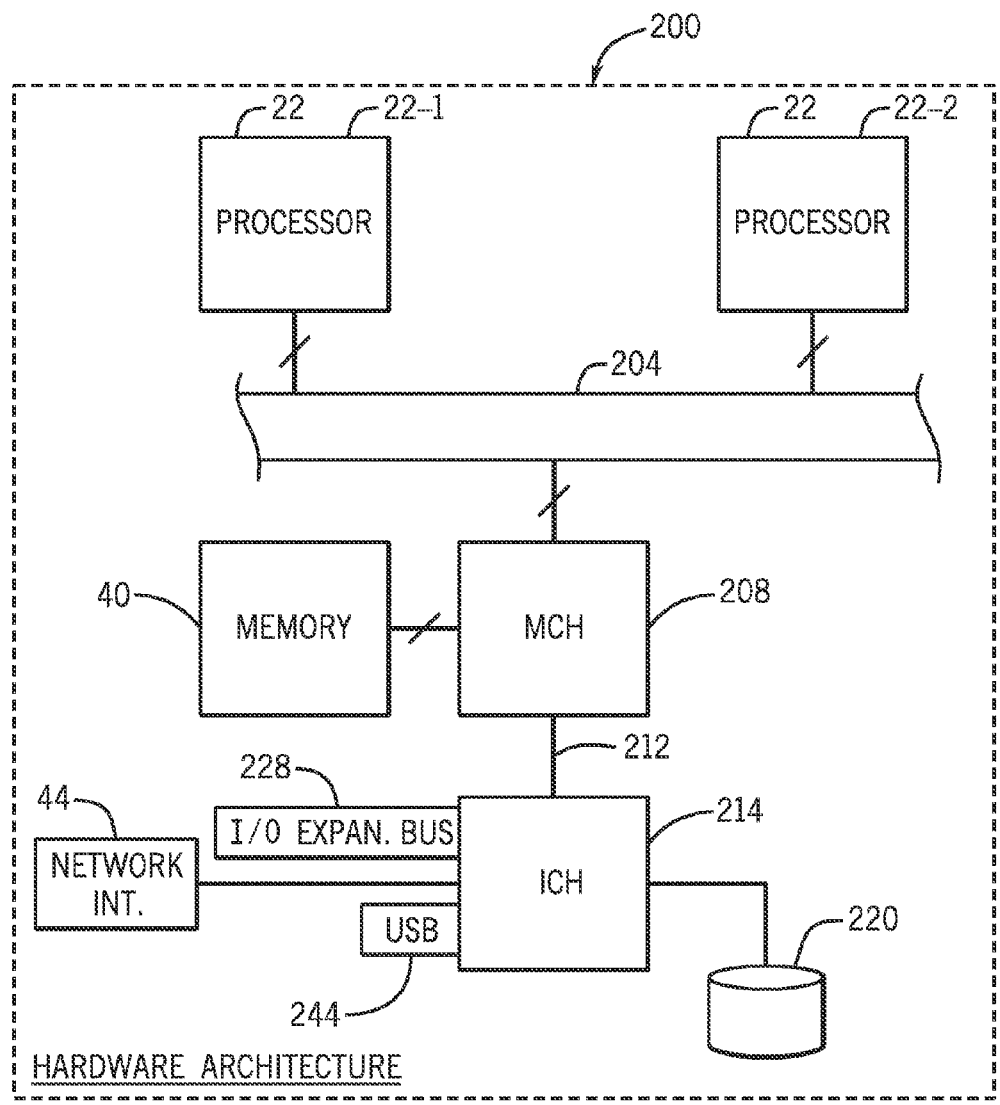
FIG. 5 is a schematic diagram of a hardware architecture of the computer of FIG. 1 according to an exemplary implementation.

Referring to FIG. 5, in accordance with exemplary implementations, the computer 10 may have a hardware architecture 200, although the computer 10 may have other hardware architectures, in accordance with further implementations. Moreover, the implementation that is depicted in FIG. 5 is simplified, as the hardware architecture 200 may have additional and different components, in accordance with other implementations.

For this example, the architecture 200 includes multiple processors 22 (processors 22-1 and 22-2, being depicted in FIG. 5, as non-limiting examples), which are coupled to a front side bus 204. A memory controller hub (MCH) 208 is coupled to the front side bus 204 to control access to the memory 40 as well as provide access for the processors 22 to an input/output I/O controller hub (ICH) 214. In this manner, the MCH 208 and the ICH 214 may communicate over a hub link 212.

In the general, the ICH 214 may control operations on a Universal Serial Bus (USB) 224. As a non-limiting example the USB 224 may conform to the Universal Serial Bus 3.0 Specification, Revision 1.0, Jun. 6, 2011. The ICH 214 may further control operations on one or more buses, such as, for example, an I/O expansion bus 228. Moreover, the ICH 214 may communicate with the network interface 44 and control operations of at least one hard drive 220.

The following examples pertain to further embodiments.

In an example implementation, an apparatus includes a memory that is accessible by an operating system; and a basic input/output system (BIOS) handler to, in response to detected malicious software activity, store data in the memory to report the activity to the operating system.

In some implementations, the BIOS handler determines an address of at least one executable instruction associated with the malicious software activity and stores data indicative of the address in the memory. In some implementations, the memory includes at least one bit of a register of a microprocessor. In some implementations, the BIOS handler asserts a signal to alert the operating system to check the memory. In some implementations, the BIOS handler is invoked in response to a system management interrupt occurring due to the detected malicious software activity. In some implementations, the BIOS handler is adapted to be invoked in response to due to a detected attempt by executing instructions to modify locked configuration bits of a processor. In some implementations, the BIOS handler is adapted to be invoked in response to an attempt by executing instructions to, during a system management mode, direct processor execution to instructions stored outside of an expected location for system management mode instructions. In some implementations, the BIOS handler is adapted to determine the address based at least in part on a code selector and instruction pointer of a processor. In some implementations, the BIOS handler is adapted to determine the location from a stack used by a general purpose error (GPE) handler. In some implementations, the operating system is a host operating system or a guest operating system.

In some implementations, a method includes alerting a BIOS of a computer to detected malicious software activity on the computer; and using the BIOS to report the detection to an operating system of the computer.

In some implementations, using the BIOS to report the detection includes reporting a location of machine executable instructions associated with the malicious software activity to the operating system. In some implementations, alerting the BIOS includes executing at least one BIOS instruction in response to a detected attempt by executing instructions to modify locked configuration bits of a processor. In some implementations, alerting the BIOS includes executing at least one BIOS instruction in response to a detected attempt by executing instructions to, during a system management mode of a processor, direct the processor to execute instructions outside of an expected location for system management mode instructions. In some implementations, using the BIOS to report the detection includes reporting a location of machine executable instructions associated with the malicious software activity based at least in part on content in a code selector and an instruction pointer of a processor. In some implementations, using the BIOS to report the detection includes reporting a location of machine executable instructions associated with the malicious software activity based at least in part on a stack content used by a general purpose error (GPE) handler. In some implementations, using the BIOS to report includes updating a memory accessible by the operating system with data indicative of the location. In some implementations, using the BIOS to report includes modifying a content of a processor register to alert the operating system to the detected malicious software activity.

In some implementations, an apparatus may include a processor that is configured to perform the features of the method that is described above.

In some embodiments, at least one machine readable device includes at least one machine readable device that includes a plurality of instructions that in response to being executed on a computing device, cause the computing device to carry out the features of the method that is described above.

While a limited number of examples have been disclosed herein, those skilled in the art, having the benefit of this disclosure, will appreciate numerous modifications and variations therefrom. It is intended that the appended claims cover all such modifications and variations.

What is claimed is:

1. An apparatus comprising:
a central processing unit (CPU) comprising at least one CPU register accessible by an operating system; and
a basic input/output system (BIOS) handler to, in response to a detected execution of unauthorized malicious software, store data in the at least one register to report the detection to the operating system, wherein the BIOS handler is adapted to be invoked in response to a detected unauthorized attempt by executing instructions to modify locked configuration bits of a processor without first removing locks that prevent modification of the configuration bits.

2. The apparatus of claim 1, wherein the BIOS handler determines an address of at least one executable instruction associated with the detected execution of malicious software and stores data indicative of the address in the at least one register.

3. The apparatus of claim 1, wherein the BIOS handler asserts a signal to alert the operating system to check the at least one register.

4. The apparatus of claim 1, wherein the BIOS handler is invoked in response to a system management interrupt.

5. The apparatus of claim 1, wherein the BIOS handler is adapted to be invoked in response to an attempt by executing instructions to, during a system management mode, direct processor execution to instructions stored outside of an expected location for system management mode instructions.

6. The apparatus of claim 1, wherein the BIOS handler is adapted to determine an address of at least one executable instruction associated with the detected execution of the unauthorized malicious software based at least in part on a code selector and an instruction pointer of a processor.

7. The apparatus of claim 1, wherein the BIOS handler is adapted to determine an address of at least one executable instruction associated with the detected execution of the unauthorized malicious software from a stack used by a general protection exception (GPE) handler.

8. The apparatus of claim 1, wherein the operating system comprises a host operating system or a guest operating system.

9. The apparatus of claim 1, wherein the at least one CPU register comprises an enhanced Machine Check Architecture (eMCA) memory.

10. A method comprising:
alerting a basic input/output operating system (BIOS) of a computer to a detected execution of unauthorized malicious software on the computer; and
using the BIOS to report the detection to an operating system of the computer, wherein using the BIOS comprises storing data in a central processing unit (CPU) register, wherein using the BIOS to report comprises updating a memory accessible by the operating system with data indicative of an address of at least one executable instruction associated with the unauthorized malicious software.

11. The method of claim 10, wherein using the BIOS to report the detection comprises reporting an address of at least one machine executable instruction associated with the unauthorized malicious software to the operating system.

12. The method of claim 10, wherein alerting the BIOS comprises executing at least one BIOS instruction in response to a detected unauthorized attempt by executing instructions to modify locked configuration bits of a processor without first removing locks preventing modification of the configuration bits.

13. The method of claim 10, wherein alerting the BIOS comprises executing at least one BIOS instruction in response to a detected attempt by executing instructions to, during a system management mode of a processor, direct the processor to execute instructions outside of an expected location for system management mode instructions.

14. The method of claim 10, wherein using the BIOS to report the detection comprises reporting an address of at least one machine executable instructions associated with the execution of the unauthorized malicious software based at least in part on content in a code selector and an instruction pointer of a processor.

15. The method of claim 10, wherein using the BIOS to report the detection comprises reporting an address of at least one machine executable instruction associated with the unauthorized malicious software based at least in part on a stack content used by a general protection exception (GPE) handler.

16. The method of claim 10, wherein using the BIOS to report comprises modifying a content of a processor register to alert the operating system to the detected execution of unauthorized malicious software.

* * * * *